Dec. 25, 1923.
W. T. CAVE
1,478,733
PISTON FOR INTERNAL COMBUSTION AND OTHER ENGINES
Filed April 26, 1923
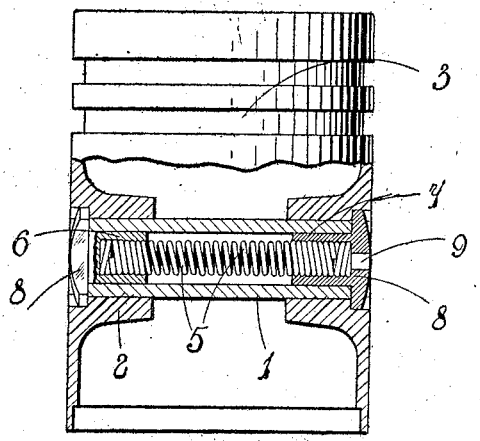
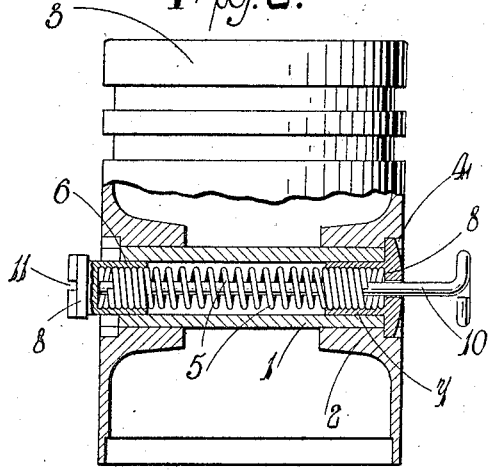
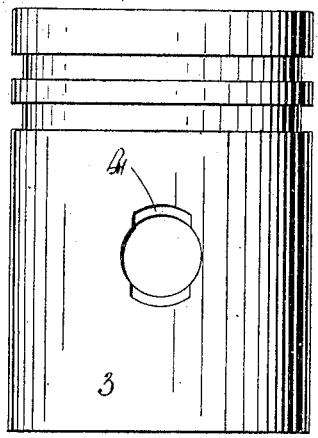
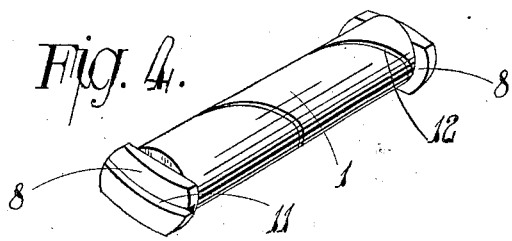

Patented Dec. 25, 1923.

1,478,733

UNITED STATES PATENT OFFICE.

WALTER THOMAS CAVE, OF REDDITCH, ENGLAND, ASSIGNOR OF TWO-THIRDS TO FRANK EDWARD BAKER, OF BIRMINGHAM, WARWICK, ENGLAND.

PISTON FOR INTERNAL-COMBUSTION AND OTHER ENGINES.

Application filed April 26, 1923. Serial No. 634,829.

*To all whom it may concern:*

Be it known that I, WALTER THOMAS CAVE, a subject of the King of Great Britain, residing at 93 Oakly Road, Redditch, in the county of Worcester, England, have invented certain new and useful Improvements in or Relating to Pistons for Internal-Combustion and Other Engines (for which I have filed an application in Great Britain, Serial No. 7,560, filed 15th March, 1922); and I do hereby declare the following to be a full, clear, and exact description of the same.

This invention relates to pistons of internal combustion and other engines and refers more particularly to a device for securing in position a gudgeon pin of the "floating" kind, i. e. one which is rotatable in its bearing surface in the piston.

The object of the present invention is to provide an improved mounting for the gudgeon pin.

This invention refers to a gudgeon pin mounting for the pistons of internal combustion engines of the kind wherein the gudgeon pin is secured against axial displacement by means of a flanged member at each end connected together by a member passing through the centre of the gudgeon pin, and in accordance with the invention, I make the connecting member extensible, so that while it retains the flanged member in a position in which they are incapable of detachment, it can be extended as required to permit such detachment.

Further, this extensible connecting member avoids any possibility of a friction tight mounting of the gudgeon pin with the piston as it allows it to float freely in its bearings.

The extensible member may be formed by a close coiled spring and the securing members may be arranged to screw on to or into the end coils of the spring. In this case, the threads which are formed on or in the securing members may be of a different pitch to those of the coils of the spring, so as to form a friction lock between the parts.

A rod or push wire may be provided for extending the extensible member, and for this purpose the push wire may pass through a central hole in one of the securing members and also extend through the extensible member, and by a forward pressure of the wire the opposite securing member may be moved from a position in which it is fixed into a position in which it is free.

Referring to the drawings:—

Figure 1 is a part sectional view of a piston provided with a gudgeon pin arranged according to this invention.

Figure 2 is a similar view showing one of the securing members held in a position suitable for applying or detaching.

Figure 3 is a side view of piston with gudgeon pin unit removed.

Figure 4 is a perspective view showing the gudgeon pin unit.

In the construction illustrated upon the accompanying drawings, the gudgeon pin 1 is of tubular form and is mounted in the bosses 2 in the sides of the piston 3. The gudgeon pin is of such a length that its ends lie flush with the bases of the recesses 4 provided in the periphery of the piston 3, and is shown provided with an oil groove 12 for lubrication purposes.

The close coiled spring 5, which is of less diameter than the internal diameter of the gudgeon pin 1 and also shorter in length than the said pin, is arranged inside the gudgeon pin, and securing members 6 and 7 are provided at the ends. These securing members 6 and 7 are of tubular form internally threaded and are adapted to screw on to the ends of the spring 5 and to fit in the ends of the gudgeon pin 1. If desired, the pitch of the thread inside the tubular members 6 and 7 may be of slightly greater pitch than the normal pitch of the spring 5, so that the spring will be extended slightly on screwing into the members and will so cause a certain locking effect.

The tubular securing members 6 and 7 are provided with enlarged heads 8 of some non-circular shape, such as that illustrated, which heads are adapted to lie in correspondingly shaped recesses 4 in the periphery of the piston 3 and thus be restrained against rotation. Instead of making the heads 8 and recesses 4 of the shape shown, they may be made of any other non-circular shape, or the contacting faces of the head and the recess may be of irregular form or provided with serrations.

To secure the gudgeon 1 in place in the piston 3, the spring 5 with one securing member 7 attached is passed within the gudgeon pin 1 and the opposite securing member 6 is engaged by rotating it until it becomes flush with the periphery of the piston 3. To permit the securing member 6 to be screwed right home into the recess 4, the extensible member 5 has to be extended. This is conveniently done by providing a hole 9 through the centre of the head of the securing member 7 through which can be passed the rod or push wire 10 which is adapted to extend through the spring and to press upon the inner side of the head of the opposite securing member 6, so that this is moved out of contact with the piston into a position such as shown in Figure 2. Thus, by extending the spring 5, the securing member 6 is enabled to be screwed right home on to the said spring. Upon the removal of the rod or push wire 10, the spring 5 will contract and bring the securing members 6 and 7 into a flush position in the recesses 4 on the exterior of the piston.

The gudgeon pin may obviously be removed in a similar manner. The push wire 10 is inserted and the securing member 6 moved into a position, such as shown in Figure 2, where it can easily be unscrewed. The head of this member 6 is conveniently provided with a diametral slot 11 adapted to be engaged by a screw driver.

What I claim then is:—

1. A gudgeon pin mounting for pistons of internal combustion engines comprising two flanged members adapted to fit one at each end of the gudgeon pin, an extensible member connecting the said flanged members to prevent axial movement of the gudgeon pin, and means detachably securing one of said flanged members to said extensible member which normally retains the flanged member against detachment, but by extending the connecting member permits it to be moved into a position in which it can be detached.

2. A gudgeon pin mounting for pistons of internal combustion engines comprising two flanged members adapted to fit one at each end of the gudgeon pin, an extensible member connecting the said flanged members to prevent axial movement of the gudgeon pin, a boss on one of said flanges adapted to fit within the end of the gudgeon pin, and means on said boss for detachably attaching said extensible member which normally retains the flanged member against detachment, but by extending the connecting member permits it to be moved into a position in which it can be detached.

3. A gudgeon pin mounting for pistons of internal combustion engines comprising two flanged members adapted to fit one at each end of the gudgeon pin, a helically coiled extensible member connecting said flanged members to normally prevent axial movement of the gudgeon pin, a boss on one of said flanges adapted to fit within the end of the gudgeon pin, and means on said boss for detachably attaching said extensible member which normally retains the flanged member against detachment, but by extending the connecting member, permits it to be moved into a position in which it can be detached.

4. A gudgeon pin mounting for pistons of internal combustion engines comprising two flanged members adapted to fit one at each end of the gudgeon pin, a helically coiled extensible member connecting said flanged members to normally prevent axial movement of the gudgeon pin, means detachably securing one of said flanged members to said extensible member which normally retains the flanged member against detachment, and means for extending the connecting member and moving the detachable flanged member into a position in which it can be detached.

5. A gudgeon pin mounting for pistons of internal combustion engines comprising two flanged members adapted to fit one at each end of the gudgeon pin, a boss on the flanged member adapted to fit within the end of the gudgeon pin and having a helical thread, a helically coiled extensible member connecting said flanged members adapted to engage with the thread in the boss to detachably secure the flanged member and maintain it normally in a position in which detachment is prevented, and means for extending the connecting member and moving the detachable flanged member into a position in which it can be detached.

6. A gudgeon pin mounting for pistons of internal combustion engines comprising two non-circular flanged members, one having means whereby it can be rotated and the other having a hole, extending bosses on said flanges adapted to fit within the ends of the gudgeon pin and having a helical thread, a helically coiled extensible member of a slightly different pitch to the threads in the bosses, adapted to be screwed into engagement with the said threads to connect the two flanged members and normally prevent axial movement of the gudgeon pin, and also normally retain the flanged members in a position in which detachment is prevented, and a rod adapted to pass through the hole in the one flanged member and through the extensible member into contact with the other flanged member, whereby the latter is moved outwardly by extending the connecting member into a position in which it can be rotated and detached.

7. A piston having a hollow floating gudgeon pin, recesses in the periphery of the piston adjacent said gudgeon pin, two flanged members adapted to fit one at each end of the gudgeon pin in said recesses, an extensible member connecting the said flanged members to prevent axial movement of the gudgeon pin, and means detachably securing one of said flanged members to said extensible member which normally retains the flanged member against detachment but by extending the connecting member permits it to be moved into a position in which it can be detached.

8. A piston having a hollow floating gudgeon pin, non-circular recesses in the periphery of the piston adjacent said gudgeon pin, two non-circular flanged members adapted to fit one at each end of the gudgeon pin in said recesses, an extensible member connecting the said flanged members to prevent axial movement of the gudgeon pin, and means detachably securing one of said flanged members to said extensible member which normally retains the flanged member against detachment, but by extending the connecting member permits it to be moved into a position in which it can be detached.

9. A piston having a hollow floating gudgeon pin, recesses in the periphery of the piston adjacent said gudgeon pin, two flanged members adapted to fit one at each end of the gudgeon pin in said recesses, an extensible member connecting the said flanged members to prevent axial movement of the gudgeon pin, a boss on one of said flanges adapted to fit within the end of the gudgeon pin, and means on said boss for detachably attaching said extensible member which normally retains the flanged member against detachment, but by extending the connecting member, permits it to be moved into a position in which it can be detached.

10. A piston having a hollow floating gudgeon pin, recesses in the periphery of the piston adjacent said gudgeon pin, two flanged members adapted to fit one at each end of the gudgeon pin in said recesses, a helically coiled extensible member connecting said flanged members to normally permit axial movement of the gudgeon pin, means detachably securing one of said flanged members to said extensible member which normally retains the flanged member against detachment, and means for extending the connecting member and moving the detachable flanged member into a position in which it can be detached.

11. A piston having a hollow floating gudgeon pin, non-circular recesses in the periphery of the piston adjacent said gudgeon pin, two non-circular flanged members adapted to fit one at each end of the gudgeon pin in said recesses, a helically coiled extensible member connecting said flanged members to normally prevent axial movement of the gudgeon pin, means detachably securing one of said flanged members to said extensible member which normally retains the flanged member against detachment, and means for extending the connecting member, and moving the detachable flanged member into a position in which it can be detached.

12. A piston having a hollow floating gudgeon pin, recesses in the periphery of the piston adjacent said gudgeon pin, two flanged members adapted to fit one at each end of the gudgeon pin in said recesses, a boss on the flanged member adapted to fit within the end of the gudgeon pin and having a helical thread, a helically coiled extensible member connecting said flanged members adapted to engage with the thread in the boss to detachably secure the flanged member and maintain it normally in a position in which detachment is prevented, and means for extending the connecting member and moving the detachable flanged member into a position in which it can be detached.

13. A gudgeon pin mounting for pistons of internal combustion engines comprising two flanged members adapted to fit one at each end of the gudgeon pin, an extensible member connecting the said flanged members to prevent axial movement of the gudgeon pin, and means for retaining one of said flanged members in engagement with said extensible member, said retaining means becoming inoperative when said flanged member is moved endwise by extending the extensible member.

In witness whereof I affix my signature.

WALTER THOMAS CAVE.